United States Patent
Li et al.

(10) Patent No.: US 12,426,003 B2
(45) Date of Patent: Sep. 23, 2025

(54) MEASUREMENT REPORTING METHOD, MEASUREMENT REPORTING DEVICE, AND POSITIONING SERVER

(71) Applicant: DATANG MOBILE COMMUNICATIONS EQUIPMENT CO., LTD., Beijing (CN)

(72) Inventors: Hui Li, Beijing (CN); Ren Da, Beijing (CN); Bin Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 421 days.

(21) Appl. No.: 17/925,583

(22) PCT Filed: May 14, 2021

(86) PCT No.: PCT/CN2021/093729
§ 371 (c)(1),
(2) Date: Nov. 15, 2022

(87) PCT Pub. No.: WO2021/228209
PCT Pub. Date: Nov. 18, 2021

(65) Prior Publication Data
US 2023/0345407 A1    Oct. 26, 2023

(30) Foreign Application Priority Data

May 15, 2020   (CN) .......................... 202010414215.3

(51) Int. Cl.
*H04W 64/00*      (2009.01)
*H04W 24/10*      (2009.01)

(52) U.S. Cl.
CPC ........... *H04W 64/00* (2013.01); *H04W 24/10* (2013.01)

(58) Field of Classification Search
CPC ....... H04W 64/00; H04W 4/02; G01S 5/0036; G01S 5/0218
See application file for complete search history.

(56) References Cited

U.S. PATENT DOCUMENTS

| 2014/0155090 A1 | 6/2014 | Khorashadi et al. |
| 2015/0219750 A1 | 8/2015 | Xiao et al. |

(Continued)

FOREIGN PATENT DOCUMENTS

| CN | 104662436 A | 5/2015 |
| CN | 105578591 A | 5/2016 |

(Continued)

OTHER PUBLICATIONS

European Patent Office, Extended European Search Report Issued in Application No. 21803533.5, May 22, 2024, Germany, 9 pages.

*Primary Examiner* — Barry W Taylor
(74) *Attorney, Agent, or Firm* — KILPATRICK TOWNSEND & STOCKTON LLP (57) ABSTRACT

The embodiment of the application provides a measurement reporting method, a measurement reporting device and a positioning server, and the method includes the following steps: receiving a positioning measurement report request message sent by a positioning server; reporting positioning measurement related information based on the positioning measurement report request message, and the positioning measurement related information includes any one of the following items: a positioning measurement value and line-of-sight information corresponding to the positioning measurement value, a positioning measurement value satisfying line-of-sight requirements, or a positioning measurement value satisfying line-of-sight requirements and line-of-sight information corresponding to the positioning measurement value. The embodiment of the application ensures the accuracy for positioning.

12 Claims, 3 Drawing Sheets

```
receiving a positioning measurement report request       101
message sent by a positioning server reporting positioning measurement related information    102
based on the positioning measurement report request
message
```

(56) References Cited

U.S. PATENT DOCUMENTS

| | | | | |
|---|---|---|---|---|
| 2021/0239783 A1* | 8/2021 | Calcev | ................ | G01S 5/0215 |
| 2023/0056394 A1* | 2/2023 | Priyanto | ............... | G01S 5/0218 |
| 2023/0292278 A1* | 9/2023 | Masal | .................. | H04L 5/0051 |
| 2024/0275547 A1* | 8/2024 | Hirzallah | .................. | G01S 5/02 |

FOREIGN PATENT DOCUMENTS

| | | | |
|---|---|---|---|
| CN | 109392089 A | 2/2019 | |
| CN | 110488222 A | 11/2019 | |
| CN | 110909108 A | 3/2020 | |
| WO | 2020068295 A1 | 4/2020 | |

\* cited by examiner

MEASUREMENT REPORTING METHOD, MEASUREMENT REPORTING DEVICE, AND POSITIONING SERVER

CROSS-REFERENCE TO RELATED APPLICATIONS

The present application is a US National Stage of International Application No. PCT/CN2021/093729, filed on May 14, 2021, claims priority to Chinese patent application No. 202010414215.3, filed on May 15, 2020, entitled "Measurement Reporting Method, Measurement Reporting Device, and Positioning Server", which are hereby incorporated by reference in their entireties.

FIELD

The present application relates to the field of communications, and in particular, to a measurement reporting method, a measurement reporting device, and a positioning server.

BACKGROUND

In the New Radio (NR) of 5G, a positioning server receives a positioning measurement value reported by a terminal or a base station, and performs location calculation on the terminal based on the positioning measurement value. Accurate location estimation can be obtained if the positioning measurement value measured based on a line-of-sight (LOS) path among the reported positioning measurement values is utilized. However, if the positioning measurement value is obtained based on the non-line-of-sight (NLOS) measurement, the accuracy for positioning is significantly reduced, i.e. the measurement values should be eliminated when the location estimation is required.

However, it is difficult to screen the measurement value for location calculation, and is unable to ensure the accuracy for positioning since the positioning server cannot know whether the positioning measurement value is obtained based on the line-of-sight or the non-line-of-sight.

SUMMARY

The embodiment of the application provides a measurement reporting method, measurement reporting device and a positioning server to improve positioning accuracy.

The embodiment of the application provides a measurement reporting method, performed by a measurement reporting device, and including the following:
  receiving a positioning measurement report request message sent by a positioning server;
  reporting positioning measurement related information based on the positioning measurement report request message, where the positioning measurement related information includes any one of the following items: a positioning measurement value and line-of-sight (LOS) information corresponding to the positioning measurement value; a positioning measurement value satisfying line-of-sight requirements; and the positioning measurement value satisfying the line-of-sight requirements and the line-of-sight information corresponding to the positioning measurement value.

The embodiment of the application provides a measurement reporting method, performed by a positioning server, and includes the following:
  sending a positioning measurement report request message to a measurement reporting device;
  receiving positioning measurement related information reported based on the positioning measurement report request message by the measurement reporting device, where the positioning measurement related information includes any one of the following items: a positioning measurement value and line-of-sight information corresponding to the positioning measurement value; a positioning measurement value satisfying line-of-sight requirements; and the positioning measurement value satisfying the line-of-sight requirements and the line-of-sight information corresponding to the positioning measurement value.

An embodiment of the present application provides a measurement reporting apparatus, which is applied to a measurement reporting device, and includes:
  a receiving device, configured to receive a positioning measurement report request message sent by a positioning server;
  a reporting device, configured to report positioning measurement related information based on the positioning measurement report request message, where the positioning measurement related information includes any one of the following items: a positioning measurement value and line-of-sight information corresponding to the positioning measurement value; a positioning measurement value satisfying line-of-sight requirements; and the positioning measurement value satisfying the line-of-sight requirements and the line-of-sight information corresponding to the positioning measurement value.

The embodiment of the application provides a measurement reporting apparatus, which is applied to a positioning server, and includes:
  a sending device, configured to send a positioning measurement report request message to a measurement reporting device;
  a receiving device, configured to receive positioning measurement related information reported by the measurement reporting device based on the positioning measurement report request message, and the positioning measurement related information includes any one of the following: a positioning measurement value and line-of-sight information corresponding to the positioning measurement value; a positioning measurement value satisfying the line-of-sight requirements; or the positioning measurement value satisfying the line-of-sight requirements and the line-of-sight information corresponding to the positioning measurement value.

The embodiment of the application provides a measurement reporting device, which includes a memory storing a computer program, and a processor, the computer program, when executed by the processor, causes the processor to perform the steps of the measurement reporting method.

The embodiment of the application provides a positioning server, which includes a memory storing a computer program and a processor, the computer program, when executed by the processor, causes the processor to perform the steps of the measurement reporting method performed by the measurement reporting device.

An embodiment of the present application provides a non-transitory computer-readable storage medium, on which a computer program is stored, where the computer program is executed by a processor to implement the steps of the measurement reporting method performed by the positioning server.

In the measurement reporting method, the measurement reporting device, and the positioning server provided in the embodiments of the present application, positioning measurement related information is reported based on the positioning measurement report request message by receiving a positioning measurement report request message sent by a positioning server, and the positioning measurement related information includes any one of the following items: a positioning measurement value and line-of-sight information corresponding to the positioning measurement value, a positioning measurement value satisfying line-of-sight requirements, or a positioning measurement value satisfying line-of-sight requirements and the line-of-sight information corresponding to the positioning measurement value. In this way, the positioning measurement value can be associated with the line-of-sight information, and thus when receiving the positioning measurement value associated with the line-of-sight information, the positioning server can select to use a positioning measurement value obtained based on the line-of-sight measurement to calculate the position of the terminal or the base station, accuracy for positioning is ensured, and a problem of a low accuracy for positioning by calculating a location based on a positioning measurement value obtained by the positioning server from non-line-of-sight measurement since the positioning measurement information reported by the terminal or base station cannot indicate whether a positioning measurement is based on line-of-sight measurement is avoided.

BRIEF DESCRIPTION OF THE DRAWINGS

In order to more clearly illustrate solutions disclosed in the embodiments of the present application or the related art, the drawings used in the descriptions of the embodiments or the prior art will be briefly described below. The drawings in the following description are only embodiments of the present application, and other drawings can be obtained according to the drawings.

DETAILED DESCRIPTION

The embodiments of the present application are made clearer, the embodiments of the present application will be clearly and completely described below with reference to the drawings in the embodiments of the present application, and the described embodiments are some embodiments of the present application, but not all embodiments. All other embodiments of the present application belong to the protection scope of the present application.

In order to clearly describe solutions of the embodiments of the present application, in the embodiments of the present application, if words such as "first" and "second" are used to distinguish identical items or similar items with substantially the same functions and actions, words such as "first" and "second" do not limit the quantity and execution order.

Furthermore, it should be appreciated that reference throughout this specification to "one embodiment" or "an embodiment" means that a particular feature, structure or characteristic described in connection with the embodiment is included in at least one embodiment of the present application. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In various embodiments of the present application, it should be understood that the sequence numbers of the following processes do not mean the execution sequence, and the execution sequence of each process should be determined by the function and the inherent logic of the process, and should not constitute any limitation to the implementation process of the embodiments of the present application.

In NR, corresponding positioning measurement value is defined for each positioning technology. In a downlink positioning technology, a terminal measures a downlink positioning reference signal (PRS) to obtain a positioning measurement value, and the terminal reports the positioning measurement value, and a base station measures an uplink sounding reference signal (SRS) to obtain a positioning measurement value. When the terminal reports, it needs to report one or more positioning measurement values for each transmission reception point (TRP) or base station (gNB); when a base station reports, each base station needs to report one or more positioning measurement values.

For example, for a downlink time difference of arrival (TDOA) technique, a terminal may measure positioning reference signals sent by N TRPs/gNBs, obtain N positioning measurement values, and report these positioning measurement values, where each positioning measurement value corresponds to one TRP/gNB. For the uplink TDOA technology, a terminal sends an uplink positioning reference signal, M gNBs measure the positioning reference signal, and each gNB determines a positioning measurement value and reports the positioning measurement value to a positioning server. The positioning server performs location calculation based on the location measurements of multiple TRPs/gNBs (e.g., N positioning measurement values for DL-TDOA, M positioning measurement values for UL-TDOA). If the positioning in the horizontal and vertical dimensions is carried out, at least three positioning measurement values corresponding to TRP/gNB are needed, and the location of the terminal can be determined through location calculation.

In the above process, the measurement information reported by the terminal or the base station is unable to reflect whether each positioning measurement value is obtained based on line-of-sight (LOS) measurement. If a positioning measurement value is obtained based on the non-line-of-sight (NLOS) measurement and then is used in location calculation, the accuracy for positioning would be significantly decreased. However, the positioning server does not have enough information to determine whether the positioning measurement value is obtained based on the line-of-sight, and it is difficult to screen the measurement value to perform location calculation, and further, it is difficult to ensure the accuracy for positioning. In this view, the present application provides the following embodiments to improve the accuracy for positioning.

Figure 1:
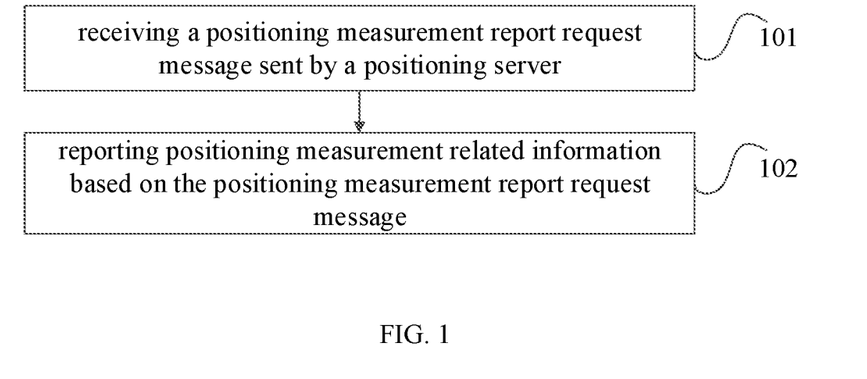
FIG. 1 is a flowchart illustrating steps of a measurement reporting method performed by a measurement reporting device in an embodiment of the present application.

As shown in FIG. 1, it shows a flowchart of a measurement reporting method performed by a measurement reporting device in an embodiment of the present application, where the method includes the following steps:

step 101: receiving a positioning measurement report request message sent by a positioning server.

In an embodiment, the measurement reporting device may be a terminal or a base station.

In this step, the measurement reporting device receives the positioning measurement report request message sent by the positioning server.

Step 102: reporting positioning measurement related information based on the positioning measurement report request message.

In an embodiment, the positioning measurement related information includes any one of the following items: a positioning measurement value and line-of-sight information corresponding to the positioning measurement value; a positioning measurement value satisfying line-of-sight requirements; and a positioning measurement value satisfying the line-of-sight requirements and line-of-sight information corresponding to the positioning measurement value.

In an embodiment, each of the positioning measurement values may be a positioning measurement value obtained by measuring positioning reference signals by using a time of arrival (TOA) technique, or may be a positioning measurement value obtained by using a TDOA technique, which is not limited herein.

In addition, in an embodiment, the line-of-sight information may be indication information for indicating whether the positioning measurement value corresponds to a line-of-sight path or a line-of-sight confidence probability corresponding to the positioning measurement value.

When the line-of-sight information is indication information for indicating whether the positioning measurement value corresponds to the line-of-sight path, the line-of-sight information may be 1 bit. In this case, a value of 0 may be used to indicate that the positioning measurement value does not correspond to a line-of-sight path, and a value of 1 may be used to indicate that the positioning measurement value corresponds to a line-of-sight path, or vice versa, which is not limited herein.

When the line-of-sight information is the line-of-sight confidence probability corresponding to the positioning measurement value, the line-of-sight confidence probability is used for representing the possibility that the positioning measurement value is the line-of-sight path.

In addition, the line-of-sight information may be calculated according to the multi-path information of the positioning measurement value. For example, when the first path for each resource is taken as the positioning measurement value, a ratio of the first path to all multi-paths or consistency between the first path and the strongest path may be calculated, which is not limited herein.

Additionally, satisfying the line-of-sight requirements may mean that the line-of-sight corresponds to the positioning measurement or a corresponding line-of-sight is greater than or equal to a line-of-sight confidence probability threshold.

In this step, after receiving the positioning measurement report request message, the measurement reporting device reports the positioning measurement related information based on the positioning measurement report request message, and the positioning measurement related information includes any one of the following items: a positioning measurement value and line-of-sight information corresponding to the positioning measurement value, the positioning measurement value satisfying the line-of-sight requirements and the positioning measurement value satisfying the line-of-sight requirements and the line-of-sight information corresponding to the positioning measurement value. The positioning measurement value can be associated with the line-of-sight information, and thus when receiving the positioning measurement related information, the positioning server can select the positioning measurement value based on the line-of-sight information corresponding to the positioning measurement value or perform location calculation directly by using the positioning measurement value satisfying the line-of-sight requirements, thus accuracy for positioning is ensured, and a problem of a low accuracy for positioning by calculating a position based on a positioning measurement value obtained by the positioning server from non-line-of-sight measurement since the positioning measurement information reported by the terminal or base station cannot indicate whether a positioning measurement is based on line-of-sight measurement is avoided.

Furthermore, the positioning measurement related information includes different contents in the following different cases.

In Case 1, in case that no line-of-sight configuration information is carried in the positioning measurement report request message, the positioning measurement related information includes a positioning measurement value and line-of-sight information corresponding to the positioning measurement value.

That is, in the case that no line-of-sight configuration information is carried in the positioning measurement report request message, the measurement reporting device reports the positioning measurement value and the line-of-sight information corresponding to the positioning measurement value, the positioning server can select the positioning measurement value obtained based on the line-of-sight measurement based on the line-of-sight information corresponding to each positioning measurement value, and further the positioning server can perform location calculation based on the positioning measurement value obtained by the line-of-sight measurement, and thus the accuracy for positioning is ensured.

In Case 2, when line-of-sight configuration information is carried in the positioning measurement report request message, the positioning measurement related information includes any one of the following items:

a positioning measurement value satisfying the line-of-sight requirements; or a positioning measurement value satisfying the line-of-sight requirements and line-of-sight information corresponding to the positioning measurement value.

By carrying the line-of-sight configuration information in the positioning measurement report request message, the measurement reporting device only needs to report a positioning measurement value satisfying the line-of-sight requirements, or report a positioning measurement value satisfying the line-of-sight requirements and the line-of-sight information corresponding to the positioning measurement value, and thus the positioning server can directly calculate the location of the terminal or the base station based on the received positioning measurement values, and the accuracy for positioning is ensured since all positioning measurement values are values satisfying the line-of-sight requirements.

In an embodiment, the line-of-sight configuration information may be any one of the following items.

Item 1, the line-of-sight configuration information is used for indicating a measurement reporting device to report a positioning measurement value corresponding to a line-of-sight path.

Accordingly, the positioning measurement value satisfying the line-of-sight requirements is the positioning measurement values corresponding to the line-of-sight path.

At this time, the line-of-sight information corresponding to the positioning measurement value is indication information for indicating that the positioning measurement value correspond to the line-of-sight path.

Namely, in case that the line-of-sight configuration information is the information for indicating the positioning measurement value corresponding to a line-of-sight path reported by the measurement reporting device, the measurement reporting device performs line-of-sight calculation on the measured positioning measurement value to obtain a positioning measurement value corresponding to the line-of-sight path, and reports the positioning measurement values corresponding to the line-of-sight path or reports the positioning measurement value corresponding to the line-of-sight path and indication information for indicating that the positioning measurement value corresponds to the line-of-sight path, and thus the positioning server can directly calculate the location based on the received information after receiving the information. In this case, the accuracy for positioning is ensured, and a problem of a low accuracy for positioning by calculating a position based on a positioning measurement value obtained by the positioning server from non-line-of-sight measurement since the positioning measurement information reported by the terminal or base station cannot indicate whether a positioning measurement is based on line-of-sight measurement is avoided.

Item 2, the line-of-sight configuration information is a line-of-sight confidence probability threshold.

The positioning measurement value satisfying the line-of-sight requirements is the positioning measurement value corresponding to a target line-of-sight path, and the target line-of-sight path is a line-of-sight path greater than or equal to the line-of-sight confidence probability threshold.

At this time, the line-of-sight information corresponding to the positioning measurement value is the line-of-sight confidence probability corresponding to the positioning measurement values.

It should be noted that the line-of-sight configuration information may also be other types of threshold values, and the information is not limited herein.

In case that the line-of-sight configuration information is the line-of-sight confidence probability threshold, the measurement reporting device calculates the line-of-sight confidence probability of the measured positioning measurement value to obtain the positioning measurement value satisfying the line-of-sight confidence probability threshold, and reports positioning measurement value corresponding to the target line-of-sight path or reports the positioning measurement value corresponding to the target line-of-sight path and a line-of-sight confidence probability corresponding to the positioning measurement value, the positioning server can directly perform location calculation based on the received information after receiving the information. In this case, the accuracy for positioning is ensured, and the problem of low accuracy for positioning caused by selecting a non-line-of-sight positioning measurement value for location calculation when the positioning server cannot know whether the positioning measurement value correspond to a line-of-sight path is solved since the received positioning measurement values are all positioning measurement values corresponding to the line-of-sight greater than the line-of-sight confidence probability threshold.

Therefore, in the embodiment, each positioning measurement value is associated with the line-of-sight information, both the line-of-sight information and each positioning measurement value are reported together, or the positioning measurement value satisfying the line-of-sight configuration information and the line-of-sight information of the positioning measurement value are reported, and the positioning server can acquire the line-of-sight information of the received positioning measurement values, the problem of low positioning accuracy caused by selecting a non-line-of-sight positioning measurement value for location calculation when the positioning server cannot acquire whether the positioning measurement value corresponds to the line-of-sight is solved, and the accuracy for positioning is ensured.

Figure 2:
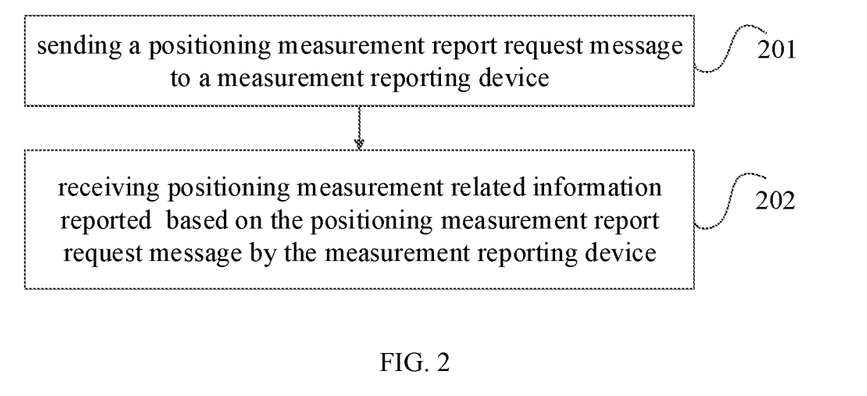
FIG. 2 is a flowchart illustrating steps of a measurement reporting method performed by a positioning server in an embodiment of the present application.

In addition, as shown in FIG. 2, it shows a flowchart of steps of a measurement reporting method performed by a positioning server in the embodiment of the present application is shown, where the method includes the following steps:

step 201: sending a positioning measurement report request message to a measurement reporting device.

In an embodiment, the positioning server sends a positioning measurement report request message to the measurement reporting device.

The measurement reporting device may be a base station or a terminal.

Step 202: receiving positioning measurement related information reported, based on the positioning measurement report request message, by the measurement reporting device.

In an embodiment, the positioning measurement related information includes any one of the following items: a positioning measurement value and line-of-sight information corresponding to the positioning measurement value; a positioning measurement value satisfying line-of-sight requirements; or a positioning measurement value satisfying the line-of-sight requirements and line-of-sight information corresponding to the positioning measurement value.

Therefore, the positioning server receives the positioning measurement related information reported based on the positioning measurement report request message by the measurement reporting device, and thus the positioning server can acquire the line-of-sight information of the received positioning measurement value, the problem of low positioning precision caused by selecting a non-line-of-sight positioning measurement value for location calculation when the positioning server cannot acquire whether the positioning measurement value corresponds to a line-of-sight path is solved, and the precision for positioning is ensured.

Furthermore, further, the positioning measurement related information includes different contents in the following different cases.

In case 1, in case that no line-of-sight configuration information is carried in the positioning measurement report request message, the positioning measurement related information includes a positioning measurement value and line-of-sight information corresponding to the positioning measurement value.

In case 2, in case that line-of-sight configuration information is carried in the positioning measurement report request message, the positioning measurement related information includes any one of the following items:

a positioning measurement value satisfying the line-of-sight requirements; or a positioning measurement value satisfying the line-of-sight requirements and line-of-sight information corresponding to the positioning measurement value.

In an embodiment, the line-of-sight configuration information is used for indicating a measurement reporting device to report a positioning measurement value corresponding to a line-of-sight path. Accordingly, the positioning measurement value satisfying the line-of-sight requirements is the positioning measurement value corresponding to the line-of-sight path. In one embodiment, the line-of-sight configuration information is a line-of-sight confidence probability threshold; and thus the positioning measurement value satisfying the line-of-sight requirements is the positioning measurement value corresponding to a target line-of-sight path, and the target line-of-sight path is the line-of-sight path greater than or equal to the line-of-sight confidence probability threshold.

In an embodiment, the line-of-sight information is indication information for indicating whether the positioning measurement value corresponds to a line-of-sight path or a line-of-sight confidence probability corresponding to the positioning measurement value.

It should be noted that, for relevant contents in the foregoing embodiment, reference may be made to relevant contents in the method embodiment of the measurement reporting device, and details are not described herein again.

In the embodiment, the positioning server sends the positioning measurement report request message to the measurement reporting device and receives the positioning measurement related information reported based on the positioning measurement report request message by the measurement reporting device, and thus the positioning measurement value is associated with the line-of-sight information, the positioning server can acquire the line-of-sight information of the received positioning measurement value, the problem of low positioning accuracy caused by selecting a non-line-of-sight positioning measurement value for location calculation when the positioning server cannot know whether the positioning measurement value corresponds to a line-of-sight path is solved, and the accuracy for positioning is ensured.

The present application is explained below by examples.

Example 1

For a downlink TDOA positioning mode, M=8 PRS resources are configured for each TRP, and each PRS resource is beam-formed differently and oriented to different directions. The positioning server configures a terminal to report reference signal time difference (RSTD for short) measurement values of P=4 TRPs (represented as TRP0, TRP1, TRP2, and TRP3), and both indicates configuration information of PRS resources of the transmission reception points to the terminal, and indicates that TRP0 is a reference TRP and PRS resource 1 is a reference resource.

When performing measurement report, for PRS resource 1 of TRP0, the terminal measures a first path of PRS resource 1 of TRP0 as TOA, and determines the line-of-sight information corresponding to the TOA value as LOS_0. At this time, the line-of-sight information may indicate whether the path is a line-of-sight by using 1 bit, and may also be a line-of-sight confidence probability indicating a possibility of the path being LOS. In an embodiment, the line-of-sight information, such as a ratio of the first path to all the multipaths, or consistency between the first path and the strongest path may be calculated according to multipath information of the PRS resource 1. For TRP1, the first path TOA of the one optimal PRS resource is determined among M=8 PRS resources, the difference between the first path TOA and TOA of the reference resource is taken as RSTD_1 of TRP1, and the line-of-sight information LOS_1 of this RSTD is determined at the same time. Similarly, for TRP2, the first path TOA of the optimal one PRS resource among M=8 PRS resources is determined, the difference of the first path TOA with TOA of the reference resource is taken as RSTD_2 of TRP2, and the line-of-sight information LOS_2 of this RSTD is determined. Similarly, RSTD_3 of TRP3 and corresponding LOS_3 thereof are determined.

The terminal reports LOS_0, RSTD_1, LOS_1, RSTD_2, LOS_2, RSTD_3 and LOS_3, and the positioning server selects corresponding RSTD from all reported RSTD according to line-of-sight information to perform location calculation.

Example 2

Assuming that the line-of-sight information is a line-of-sight confidence probability.

For the uplink TDOA positioning mode, a terminal is configured to transmit M=8 SRS resources, and each SRS resource is beamformed differently and oriented to different directions. The positioning server configures P=3 gNBs (denoted as gNB0, gNB1, and gNB2) to report relative time of arrival (RTOA) positioning measurements, and each gNB may report 4 RTOA positioning measurements. Meanwhile, the positioning server configures the positioning measurement value with the line-of-sight confidence probability of 80% or more, namely the threshold value of the line-of-sight confidence probability is configured to be 80%.

For gNB0, 4 optimal SRS resources are determined among M=8 SRS resources, and the first path of each resource is taken as one RTOA of gNB0. The line-of-sight confidence probability of the RTOA is determined, and then the line-of-sight information such as the ratio of the first path to all multi-paths, or the consistency between the first path and the strongest path may be calculated according to the multi-path information of the RTOA. If the confidence probability corresponding to the RTOA is more than or equal to 80%, the gNB0 reports both the RTOA measurement value and the line-of-sight confidence probability corresponding to the measurement value; otherwise, the measurement value is discarded. Similar reporting modes are adopted for the gNB1 and the gNB2, and details are not repeated.

Because all reported measurement values meet the line-of-sight requirements, the positioning server can use all reported RTOA to perform location calculation; or the positioning server selects the RTOA with higher confidence probability from all RTOAs for performing the location calculation.

Example 3

It is assumed that the line-of-sight information is signaling indicating whether a path is LOS by using 1 bit.

For the uplink TDOA positioning mode, a terminal is configured to transmit M=8 SRS resources, and each SRS resource is beamformed differently and oriented to a different direction. The positioning server configures P=3 gNBs (denoted as gNB0, gNB1, and gNB2) to report the RTOA positioning measurements, and each gNB may report 4 RTOA positioning measurements. Meanwhile, the positioning server only reports the positioning measurement value corresponding to the line-of-sight path.

For gNB0, 4 optimal SRS resources are determined among M=8 SRS resources, and the first path of each resource is taken as one RTOA of gNB0 and then whether the RTOA is determined to be LOS. The process can be realized by the gNB, and line-of-sight information, such as the ratio of the first path to all the multi-paths or the consistency between the first path and the strongest path can be calculated according to the multi-path information of the RTOA. If the RTOA is determined to be a positioning measurement value corresponding to the line-of-sight path, the gNB0 reports the RTOA measurement value without reporting line-of-sight information corresponding to the RTOA; otherwise, the measurement value is discarded. Similar reporting modes are adopted for the gNB1 and the gNB2, and details are not repeated.

Because all reported measurement values meet the line-of-sight requirement, the positioning server can use all the reported RTOAs to perform location calculation.

Figure 3:
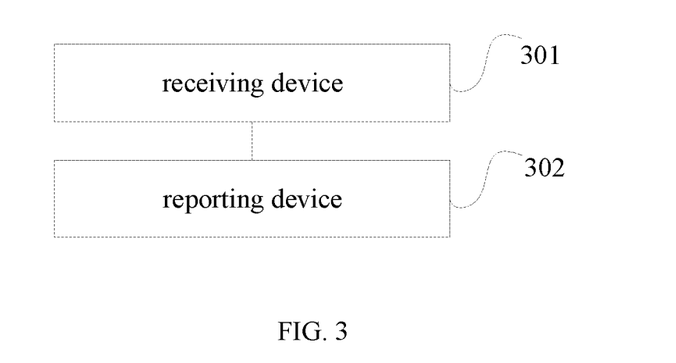
FIG. 3 is a block diagram of a measurement reporting apparatus applied to a measurement reporting device in an embodiment of the present application.

In addition, in FIG. 3, a block diagram of a measurement reporting apparatus applied to a measurement reporting device in this embodiment of the present application is shown, where the apparatus includes:

a receiving device 301, configured to receive a positioning measurement report request message sent by a positioning server;

a reporting device 302, configured to report positioning measurement related information based on the positioning measurement report request message, where the positioning measurement related information includes any one of the following items: a positioning measurement value and line-of-sight information corresponding to the positioning measurement value; a positioning measurement value satisfying line-of-sight requirements; and the positioning measurement value satisfying the line-of-sight requirements and the line-of-sight information corresponding to the positioning measurement value.

In an embodiment, in case that no line-of-sight configuration information is carried in the positioning measurement report request message, the positioning measurement related information includes a positioning measurement value and line-of-sight information corresponding to the positioning measurement value; in case that line-of-sight configuration information is carried in the positioning measurement report request message, the positioning measurement related information includes any one of the following items: a positioning measurement value satisfying line-of-sight requirements; and the positioning measurement value satisfying the line-of-sight requirements and the line-of-sight information corresponding to the positioning measurement value.

In an embodiment, the line-of-sight configuration information is used for indicating the measurement reporting device to report a positioning measurement value corresponding to the line-of-sight, and correspondingly, the positioning measurement value satisfying the line-of-sight requirements is the positioning measurement value corresponding to the line-of-sight path; or the line-of-sight configuration information is a line-of-sight confidence probability threshold; correspondingly, the positioning measurement value satisfying the line-of-sight requirement is a positioning measurement value corresponding to a target line-of-sight path, and the target line-of-sight path is a line-of-sight path greater than or equal to the line-of-sight confidence probability threshold.

In an embodiment, the line-of-sight information is indication information indicating whether the positioning measurement value corresponds to a line-of-sight path or a line-of-sight confidence probability corresponding to the positioning measurement value.

The apparatus provided in this embodiment can implement all the method steps that can be implemented in the above-described method embodiment performed by the measurement reporting device, and can achieve the same effects, which are not described herein again.

Figure 4:
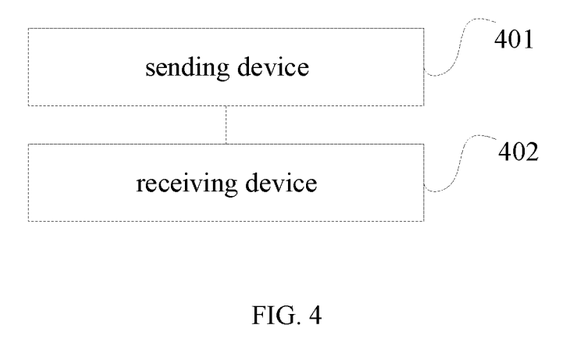
FIG. 4 is a block diagram of a measurement reporting apparatus applied to a positioning server in the embodiment of the present application.

In addition, in FIG. 4, a block diagram of a measurement reporting apparatus applied to a positioning server in the embodiment of the present application is shown, where the apparatus includes:

a sending device 401, configured to send a positioning measurement report request message to a measurement reporting device;

a receiving device 402, configured to receive positioning measurement related information reported based on the positioning measurement report request message by the measurement reporting device, where the positioning measurement related information includes any one of the following item: a positioning measurement value and line-of-sight information corresponding to the positioning measurement value; a positioning measurement value satisfying line-of-sight requirements; and the positioning measurement value satisfying the line-of-sight requirements and the line-of-sight information corresponding to the positioning measurement value.

In an embodiment, in case that no line-of-sight configuration information is carried in the positioning measurement report request message, the positioning measurement related information includes a positioning measurement value and line-of-sight information corresponding to the positioning measurement value; in case that line-of-sight configuration information is carried in the positioning measurement report request message, the positioning measurement related information includes any one of the following items: positioning measurement value satisfying the line-of-sight requirements; and the positioning measurement value satisfying the line-of-sight requirements and the line-of-sight information corresponding to the positioning measurement value.

In an embodiment, the line-of-sight configuration information is used for indicating the measurement reporting device to report a positioning measurement value corresponding to a line-of-sight path; correspondingly, the positioning measurement value satisfying the line-of-sight requirements is the positioning measurement value corresponding to the line-of-sight path; or the line-of-sight configuration information is a line-of-sight confidence probability threshold; correspondingly, the positioning measurement value satisfying the line-of-sight requirements is a positioning measurement value corresponding to a target line-of-sight path, and the target line-of-sight path is a line-of-sight path greater than or equal to the line-of-sight confidence probability threshold.

In an embodiment, the line-of-sight information is indication information indicating whether the positioning measurement value corresponds to a line-of-sight path or a line-of-sight confidence probability corresponding to the positioning measurement value.

The apparatus provided in this embodiment can implement all the method steps that can be implemented in the method embodiment performed by the positioning server, and can achieve the same effects, which are not described herein again.

Figure 5:
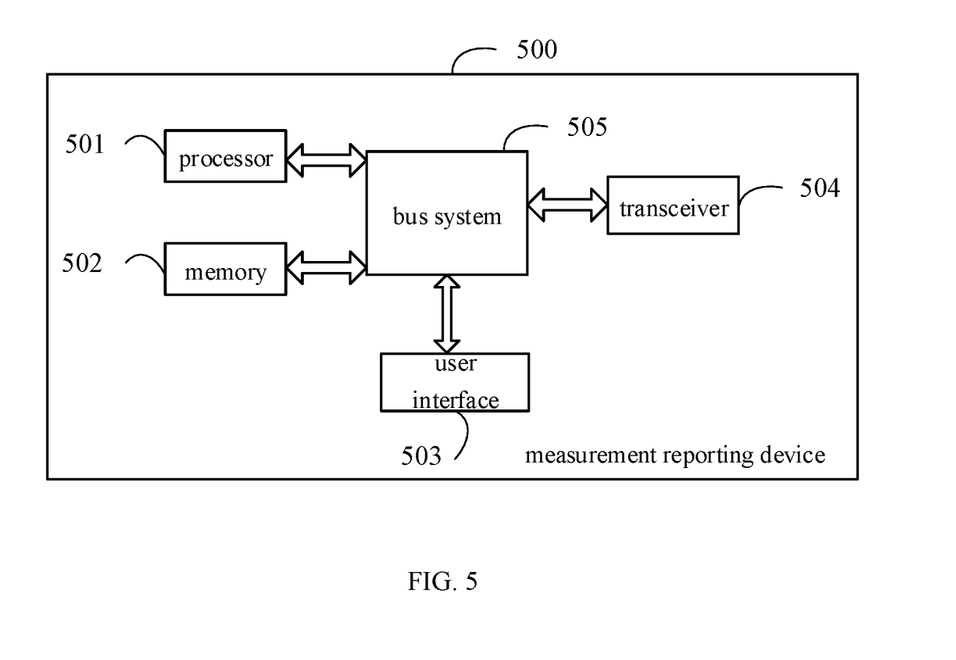
FIG. 5 is a schematic structural diagram of a measurement reporting device in an embodiment of the present application.

FIG. 5 is a schematic structural diagram of a measurement reporting device according to an embodiment of the present application, and as shown in FIG. 5, the measurement reporting device 500 may include at least one processor 501, a memory 502, at least one other user interface 503, and a transceiver 504. The various components in the measurement reporting device 500 are coupled together by a bus system 505. It is understood that the bus system 505 is used to enable connection communications between these elements. The bus system 505 includes a power bus, a control bus, and a status signal bus in addition to a data bus. For clarity of illustration, the various buses are labeled in FIG. 5 as the bus system 505, which may include any number of interconnected buses and bridges, which may be linked together by one or more processors, represented by the processor 501, and various circuits, represented by the memory 502. The bus system may also link together various other circuits such as peripherals, voltage regulators, power management circuits, and the like, which are well known in the art, and therefore, will not be described any further in this application. The bus interface provides an interface. The transceiver 504 may be elements including a transmitter and a receiver that provide a means for communicating with various other device over a transmission medium. For different user devices, the user interface 503 may also be an interface for interfacing externally to a desired device, including but not limited to a keypad, display, speaker, microphone, joystick, etc.

It will be appreciated that the memory 502 in the embodiments of the subject application can be either volatile memory or nonvolatile memory, or can include both volatile and nonvolatile memory. The non-volatile Memory may be a read-only memory (ROM), a programmable ROM (PROM), an erasable PROM (EPROM), an electrically erasable PROM (EEPROM), or a flash memory. The volatile memory may be a random access memory (RAM) which serves as an external cache. By way of example, and not limitation, many forms of RAM are available, such as static random access memory (SRAM), dynamic random access memory (DRAM), synchronous dynamic random access memory (SDRAM), double data rate synchronous dynamic random access memory (DDRSDRAM), enhanced synchronous SDRAM (ESDRAM), synchronous link DRAM (SLDRAM), and direct Rambus RAM (DRRAM). The memory 502 of the systems and methods described in connection with the various embodiments of the subject application is intended to include, but not limited thereto, these and any other suitable types of memory.

The processor 501 is responsible for managing the bus system and general processing, the memory 502 may store programs or instructions used by the processor 501 in performing operations, and in an embodiment the processor 501 may be used for: receiving a positioning measurement report request message sent by a positioning server; reporting positioning measurement related information based on the positioning measurement report request message, where the positioning measurement related information includes any one of the following items: a positioning measurement value and line-of-sight information corresponding to the positioning measurement value; a positioning measurement value satisfying line-of-sight requirements; and the positioning measurement value satisfying the line-of-sight requirements and the line-of-sight information corresponding to the positioning measurement value.

The method disclosed in the embodiments of the present application may be applied to the processor 501, or implemented by the processor 501. The processor 501 may be an integrated circuit chip having signal processing capabilities. In implementation, the steps of the above method may be performed by integrated logic circuits of hardware or instructions in software form in the processor 501. The processor 501 may be a general purpose processor, a digital signal processor (DSP), an application specific integrated circuit (ASIC), a field programmable gate array (FPGA) or other programmable logic device, discrete gate or transistor logic, or discrete hardware components. The various methods, steps, and logic blocks disclosed in the embodiments of the present application may be implemented or performed. A general purpose processor may be a microprocessor or the processor may be any conventional processor or the like. The steps of the method disclosed in connection with the embodiments of the present application may be directly implemented by a hardware decoding processor, or implemented by a combination of hardware and software modules in the decoding processor. The software modules may be located in RAM, flash, ROM, PROM, or EPROM, registers, etc. as is well known in the art. The storage medium is located in the memory 502, and the processor 501 reads the information in the memory 502 and completes the steps of the method in combination with the hardware.

It is to be understood that the embodiments described herein may be implemented in hardware, software, firmware, middleware, microcode, or a combination thereof. For a hardware implementation, the processing units may be implemented within one or more application specific integrated circuits (ASIC), digital signal processors (DSP), digital signal processing devices (DSPD), programmable logic devices (PLD), field programmable gate arrays (FPGA), general purpose processors, controllers, microcontrollers, microprocessors, other electronic units designed to perform the functions described herein, or a combination thereof.

For a software implementation, the techniques described may be implemented with modules (e.g., procedures, functions, and so on) that perform the functions described in the embodiments of the application. The software codes may be stored in a memory and executed by a processor. The memory may be implemented within the processor or external to the processor.

In another embodiment, in case that no line-of-sight configuration information is carried in the positioning measurement report request message, the positioning measurement related information includes a positioning measurement value and line-of-sight information corresponding to the positioning measurement value; in case that line-of-sight configuration information is carried in the positioning measurement report request message, the positioning measurement related information includes any one of the following items: a positioning measurement value satisfying line-of-sight requirements; and the positioning measurement value satisfying the line-of-sight requirements and the line-of-sight information corresponding to the positioning measurement value.

In another embodiment, the line-of-sight configuration information is used for indicating the measurement reporting device to report a positioning measurement value corresponding to a line-of-sight path; and the positioning measurement value satisfying the line-of-sight requirements is the positioning measurement value corresponding to the line-of-sight path; or the line-of-sight configuration information is a line-of-sight confidence probability threshold; and thus the positioning measurement value satisfying the line-of-sight requirements is a positioning measurement value corresponding to a target line-of-sight path, and the target line-of-sight path is a line-of-sight path greater than or equal to the line-of-sight confidence probability threshold.

In another embodiment, the line-of-sight information is indication information indicating whether the positioning measurement value corresponds to a line-of-sight path or a line-of-sight confidence probability corresponding to the positioning measurement value.

The measurement reporting device according to the present embodiment of the present application can implement each process implemented by the measurement reporting device in the foregoing embodiments, and is not described here again to avoid repetition.

Figure 6:
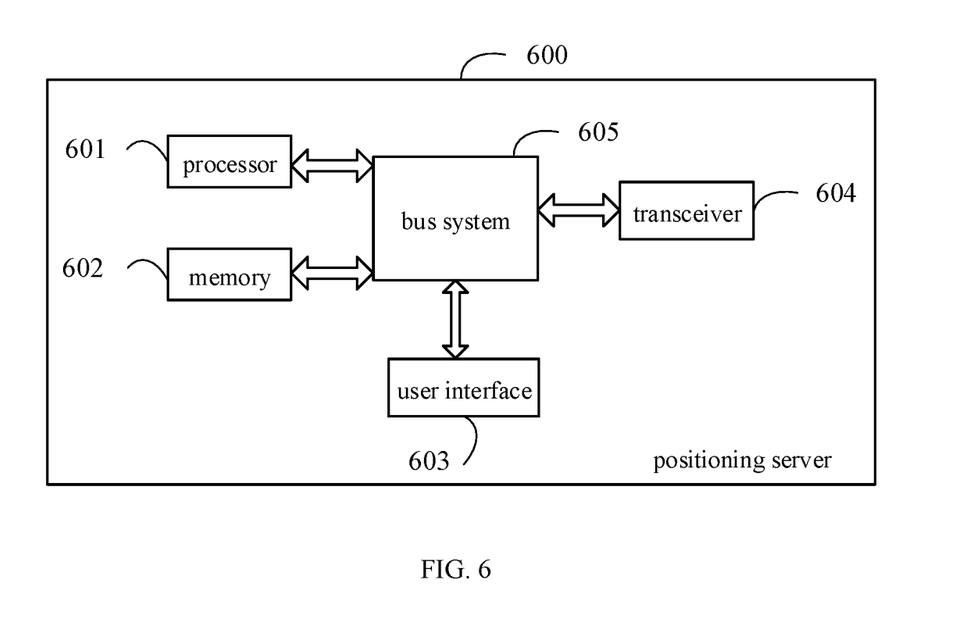
FIG. 6 is a schematic structural diagram of a positioning server in an embodiment of the present application.

FIG. 6 is a schematic structural diagram of a positioning server according to an embodiment of the present application, and as shown in FIG. 6, the positioning server 600 may include at least one processor 601, a memory 602, at least one other user interface 603, and a transceiver 604. The various components in the positioning server 600 are coupled together by a bus system 606. It is understood that the bus system 606 is used to enable communications among the components of the connection. The bus system 606 includes a power bus, a control bus, and a status signal bus in addition to a data bus. For clarity of illustration, the various busses are labeled in FIG. 6 as the bus system 606, which may include any number of interconnected buses and bridges, which may be linked together by one or more processors, represented by the processor 601, and various circuits of memory, represented by the memory 602. The bus system may also link together various other circuits such as peripherals, voltage regulators, power management circuits, and the like, which are well known in the art, and therefore, will not be described any further in this application. The bus interface provides an interface. The transceiver 604 may be elements including a transmitter and a receiver that provide a means for communicating with various other device over a transmission medium. For different user devices, the user interface 603 may also be an interface for interfacing externally to a desired device, including but not limited to a keypad, display, speaker, microphone, joystick, etc.

It will be appreciated that the memory 602 in the embodiments of the subject application can be either volatile memory or nonvolatile memory, or can include both volatile and nonvolatile memory. The non-volatile memory may be a read-only memory (ROM), a programmable ROM (PROM), an erasable PROM (EPROM), an electrically erasable PROM (EEPROM), or a flash Memory. The volatile memory may be a random access memory (RAM) which serves as an external cache. By way of example, and not limitation, many forms of RAM are available, such as static random access memory (SRAM), dynamic random access memory (DRAM), synchronous dynamic random access memory (SDRAM), double data rate synchronous dynamic random access memory (DDRSDRAM), enhanced synchronous SDRAM (ESDRAM), synchronous link DRAM (SLDRAM), and direct Rambus RAM (DRRAM). The memory 602 of the systems and methods described in the various embodiments of the present application is intended to include, without being limited to, these and any other suitable types of memory.

The processor 601 is responsible for managing the bus system and general processing, and the memory 602 may store programs or instructions used by the processor 601 in performing operations, in an embodiment the processor 601 may be configured for: sending a positioning measurement report request message to a measurement reporting device; receiving positioning measurement related information reported by the measurement reporting device based on the positioning measurement report request message, where the positioning measurement related information includes any one of the following items: a positioning measurement value and line-of-sight information corresponding to the positioning measurement value; a positioning measurement value satisfying line-of-sight requirements; and the positioning measurement value satisfying the line-of-sight requirements and the line-of-sight information corresponding to the positioning measurement value.

The method disclosed in the embodiments of the present application may be applied to the processor 601, or implemented by the processor 601. The processor 601 may be an integrated circuit chip having signal processing capabilities. In implementation, the steps of the above method may be implemented by integrated logic circuits of hardware or instructions in the form of software in the processor 601. The Processor 601 may be a general purpose processor, a digital signal processor (DSP), an application specific integrated circuit (ASIC), a field programmable gate array (FPGA) or other programmable logic device, discrete gate or transistor logic, or discrete hardware components. The various methods, steps, and logic blocks disclosed in the embodiments of the present application may be implemented or performed. A general purpose processor may be a microprocessor or the processor may be any conventional processor or the like. The steps of the method disclosed in connection with the embodiments of the present application may be directly implemented by a hardware decoding processor, or implemented by a combination of hardware and software modules in the decoding processor. The software modules may be located in RAM, flash, ROM, PROM, or EPROM, registers, etc. as is well known in the art. The storage medium is located in the memory 602, and the processor 601 reads the information in the memory 602, and in combination with the hardware thereof, performs the steps of the method.

It is to be understood that the embodiments described herein may be implemented in hardware, software, firmware, middleware, microcode, or a combination thereof. For a hardware implementation, the Processing units may be implemented within one or more application specific integrated circuits (ASIC), digital signal processors (DSP), digital signal processing devices (DSPD), programmable logic devices (PLD), field programmable gate arrays (FPGA), general purpose processors, controllers, micro-controllers, microprocessors, other electronic units designed to perform the functions described herein, or a combination thereof.

For a software implementation, the techniques described may be implemented with modules (e.g., procedures, functions, and so on) that perform the functions described in the embodiments of the application. The software codes may be stored in a memory and executed by a processor. The memory may be implemented within the processor or external to the processor.

In another embodiment, in case that no line-of-sight configuration information is carried in the positioning measurement report request message, the positioning measurement related information includes a positioning measurement value and line-of-sight information corresponding to the positioning measurement value; in case that line-of-sight configuration information is carried in the positioning measurement report request message, the positioning measurement related information includes any one of the following items: a positioning measurement value satisfying line-of-sight requirements; and the positioning measurement value satisfying the line-of-sight requirements and the line-of-sight information corresponding to the positioning measurement value.

In another embodiment, the line-of-sight configuration information is used for indicating the measurement reporting device to report a positioning measurement value corresponding to a line-of-sight path; and thus the positioning measurement value satisfying the line-of-sight requirements is the positioning measurement value corresponding to the line-of-sight path; or the line-of-sight configuration information is a line-of-sight confidence probability threshold; and thus the positioning measurement value satisfying the line-of-sight requirements is a positioning measurement value corresponding to a target line-of-sight path, and the target line-of-sight path is a line-of-sight path greater than or equal to the line-of-sight confidence probability threshold.

In another embodiment, the line-of-sight information is indication information indicating whether the positioning measurement value corresponds to a line-of-sight path or a line-of-sight confidence probability corresponding to the positioning measurement value.

The positioning server according to the embodiment of the present application can implement each process implemented by the positioning server in the foregoing embodiments, and is not described here again to avoid repetition.

The foregoing mainly introduces aspects of the embodiments of the present application from the perspective of electronic devices. It is understood that, in order to implement the functions described above, the electronic device provided in the embodiments of the present application includes a hardware structure and/or a software module for performing each function. The various illustrative elements and algorithm steps described in connection with the embodiments disclosed herein may be implemented as hardware or combinations of hardware and computer software.

Whether a function is performed in hardware or computer software drives hardware depends upon the particular application and design constraints imposed on the solution. The described functionality in varying ways for each particular application, but such implementation decisions should not be interpreted as being departed from the scope of the present application.

In the embodiment of the present application, the electronic device and the like may be divided into functional modules according to the method example, for example, each functional module may be divided corresponding to each function, or two or more functions may be integrated into one processing module. The integrated module can be realized in a hardware mode, and can also be realized in a software functional module mode.

It should be noted that, in the embodiment of the present application, the division of the module is schematic, and is only one logic function division, and another division manner may be available in actual implementation.

For convenience and simplicity of description, the above division of each functional module is only used for illustration, and in practical applications, the above function distribution may be performed by different functional modules as needed, that is, the internal structure of the equipment is divided into different functional modules to perform all or part of the above described functions. The working processes of the system, the equipment and the unit described above may refer to the corresponding processes in the foregoing method embodiments, and are not described herein again.

In the several embodiments provided in the present application, it should be understood that the disclosed equipment and method may be implemented in other manners. For example, the above-described equipment embodiments are merely illustrative, and for example, the division of the modules or units is only one type of logical functional division, and other divisions may be realized in practice, for example, multiple units or components may be combined or integrated into another system, or some features may be omitted, or not executed. In addition, the shown or discussed coupling or direct coupling or communication connection between each other may be an indirect coupling or communication connection through some interfaces, equipment or units.

The units described as separate parts may or may not be physically separate, and parts displayed as units may or may not be physical units, may be located in one position, or may be distributed on multiple network units. Some or all of the units can be selected according to actual needs to achieve the purpose of the solution of the embodiment.

In addition, functional units in the embodiments of the present application may be integrated into one processing unit, or each unit may exist alone physically, or two or more units are integrated into one unit. The integrated unit may be implemented in the form of a software functional unit.

The integrated unit, if implemented in the form of a software functional unit and sold or used as a stand-alone product, may be stored in a computer readable storage medium. Based on such understanding, all or part of the solution can be embodied in the form of a software product, which is stored in a storage medium and includes several instructions to enable a computer device (which may be a personal computer, a server, or a network device) or a processor to execute all or part of the steps of the method according to the embodiments of the present application. The computer storage medium is a non-transitory medium, including various media that can store program code, such as flash memory, removable hard drive, read-only memory, random-access memory, magnetic or optical disk, etc.

On the other hand, embodiments of the present application further provide a non-transitory computer-readable storage medium, on which a computer program is stored, and the computer program, when executed by a processor, causes the processor to perform the methods provided in the foregoing embodiments and can achieve the same effects, which are not described herein again.

What is claimed is:

1. A measurement reporting method, performed by a measurement reporting device, comprising:
receiving a positioning measurement report request message sent by a positioning server; and
reporting positioning measurement related information based on the positioning measurement report request message, wherein the positioning measurement related information comprises any one of the following items: a positioning measurement value and line-of-sight information corresponding to the positioning measurement value, a positioning measurement value satisfying line-of-sight requirements, or a positioning measurement value satisfying line-of-sight requirements and line-of-sight information corresponding to the positioning measurement value,
in case that no line-of-sight configuration information is carried in the positioning measurement report request message, the positioning measurement related information comprises the positioning measurement value and the line-of-sight information corresponding to the positioning measurement value;

in case that line-of-sight configuration information is carried in the positioning measurement report request message, the positioning measurement related information comprises any one of the following items:

the positioning measurement value satisfying line-of-sight requirements; or the positioning measurement value satisfying the line-of-sight requirements and the line-of-sight information corresponding to the positioning measurement value.

2. The method of claim 1, wherein the line-of-sight configuration information is used for indicating the measurement reporting device to report a positioning measurement value corresponding to a line-of-sight path, and the positioning measurement value satisfying the line-of-sight requirements is a positioning measurement value corresponding to the line-of-sight path; or the line-of-sight configuration information is a line-of-sight confidence probability threshold, and the positioning measurement value satisfying the line-of-sight requirements is a positioning measurement value corresponding to a target line-of-sight path, and the target line-of-sight path is a line-of-sight path greater than or equal to the line-of-sight confidence probability threshold.

3. The method of claim 1, wherein the line-of-sight information is indication information indicating whether the positioning measurement value corresponds to a line-of-sight path or a line-of-sight confidence probability corresponding to the positioning measurement value.

4. A measurement reporting method, performed by a positioning server, comprising:

sending a positioning measurement report request message to a measurement reporting device;

receiving positioning measurement related information reported based on the positioning measurement report request message by the measurement reporting device, wherein the positioning measurement related information comprises any one of the following items: a positioning measurement value and line-of-sight information corresponding to the positioning measurement value, a positioning measurement value satisfying line-of-sight requirements, or a positioning measurement value satisfying line-of-sight requirements and line-of-sight information corresponding to the positioning measurement value, in case that no line-of-sight configuration information is carried in the positioning measurement report request message, the positioning measurement related information comprises the positioning measurement value and the line-of-sight information corresponding to the positioning measurement value;

in case that line-of-sight configuration information is carried in the positioning measurement report request message, the positioning measurement related information comprises any one of the following items:

the positioning measurement value satisfying line-of-sight requirements; or the positioning measurement value satisfying the line-of-sight requirements and the line-of-sight information corresponding to the positioning measurement value.

5. The method of claim 4, wherein the line-of-sight configuration information is used for indicating the measurement reporting device to report a positioning measurement value corresponding to a line-of-sight path, and the positioning measurement value satisfying the line-of-sight requirements is a positioning measurement value corresponding to the line-of-sight path; or the line-of-sight configuration information is a line-of-sight confidence probability threshold, and the positioning measurement value satisfying the line-of-sight requirements is a positioning measurement value corresponding to a target line-of-sight path, and the target line-of-sight path is a line-of-sight path greater than or equal to the line-of-sight confidence probability threshold.

6. The method of claim 4, wherein the line-of-sight information is indication information indicating whether the positioning measurement value corresponds to a line-of-sight path or a line-of-sight confidence probability corresponding to the positioning measurement value.

7. A positioning server, comprising a memory storing a computer program and a processor, wherein the computer program, when executed on the processor, causes the processor to perform the steps of claim 4.

8. The positioning server of claim 7, wherein, the line-of-sight configuration information is used for indicating the measurement reporting device to report a positioning measurement value corresponding to a line-of-sight path, and the positioning measurement value satisfying the line-of-sight requirements is a positioning measurement value corresponding to the line-of-sight path; or the line-of-sight configuration information is a line-of-sight confidence probability threshold, and the positioning measurement value satisfying the line-of-sight requirements is a positioning measurement value corresponding to a target line-of-sight path, and the target line-of-sight path is a line-of-sight path greater than or equal to the line-of-sight confidence probability threshold.

9. The positioning server of claim 7, wherein the line-of-sight information is indication information indicating whether the positioning measurement value corresponds to a line-of-sight or a line-of-sight confidence probability corresponding to the positioning measurement values.

10. A measurement reporting device, comprising a memory storing a computer program, and a processor, wherein the computer program, when executed on the processor, causes the processor to perform the following steps:

receiving a positioning measurement report request message sent by a positioning server; and reporting positioning measurement related information based on the positioning measurement report request message, wherein the positioning measurement related information comprises any one of the following items: a positioning measurement value and line-of-sight information corresponding to the positioning measurement value, a positioning measurement value satisfying line-of-sight requirements, or a positioning measurement value satisfying line-of-sight requirement and the line-of-sight information corresponding to the positioning measurement value, in case that no line-of-sight configuration information is carried in the positioning measurement report request message, the positioning measurement related information comprises the positioning measurement value and the line-of-sight information corresponding to the positioning measurement value;

in case that line-of-sight configuration information is carried in the positioning measurement report request message, the positioning measurement related information comprises any one of the following items:

the positioning measurement value satisfying line-of-sight requirements; or the positioning measurement value satisfying the line-of-sight requirements and the line-of-sight information corresponding to the positioning measurement value.

11. The device of claim 10, wherein the line-of-sight configuration information is used for indicating the measurement reporting device to report a positioning measurement value corresponding to a line-of-sight path, and the positioning measurement value satisfying the line-of-sight requirements is a positioning measurement value corresponding to the line-of-sight path; or the line-of-sight configuration information is a line-of-sight confidence probability threshold, and the positioning measurement value satisfying the line-of-sight requirements is a positioning measurement value corresponding to a target line-of-sight path, and the target line-of-sight path is a line-of-sight path greater than or equal to the line-of-sight confidence probability threshold.

12. The device of claim 10, wherein the line-of-sight information is indication information indicating whether the positioning measurement value corresponds to a line-of-sight path or a line-of-sight confidence probability corresponding to the positioning measurement value.

* * * * *